United States Patent [19]

Tapia et al.

[11] Patent Number: 4,651,467

[45] Date of Patent: Mar. 24, 1987

[54] METHOD FOR PROTECTING PLANTS USING POLYMERIC FILM CONTAINING ANHYDROUS BORAX

[75] Inventors: Graciano J. Tapia; Oscar G. Martinez, both of Madrid, Spain

[73] Assignee: Alcudia, Empresa para la Industria Quimica, S.A., Spain

[21] Appl. No.: 649,305

[22] Filed: Sep. 11, 1984

Related U.S. Application Data

[62] Division of Ser. No. 570,504, Jan. 13, 1984, Pat. No. 4,559,381.

[51] Int. Cl.$^4$ .............................................. A01G 9/14
[52] U.S. Cl. ........................................... 47/58; 47/17
[58] Field of Search .................... 47/17, 2, 58, 29, 1

[56] References Cited

U.S. PATENT DOCUMENTS

| | | | |
|---|---|---|---|
| 4,134,875 | 1/1979 | Tapia | 47/9 X |
| 4,170,087 | 10/1979 | Tapia | 47/29 |
| 4,243,423 | 1/1981 | Hohman | 501/29 |
| 4,375,373 | 3/1983 | Abe et al. | 106/288 B |

FOREIGN PATENT DOCUMENTS

| | | |
|---|---|---|
| 845925 | 9/1975 | Belgium . |
| 2906306 | 8/1979 | Fed. Rep. of Germany . |
| 1574088 | 4/1968 | France . |
| 2213954 | 1/1973 | France . |
| 2419955 | 11/1981 | France . |
| 7213853 | 5/1968 | Japan . |
| 0088147 | 11/1973 | Japan . |
| 1074846 | 12/1974 | Japan . |
| 60347 | 5/1979 | Japan ................................ 47/17 |
| 4641 | 1/1981 | Japan ................................ 47/17 |

OTHER PUBLICATIONS

"Filmes Térmicos para Invernaderos" by G. Jorge Tapia, Seventh International Congress on Plastics in Agriculture.

Primary Examiner—Robert A. Hafer
Assistant Examiner—Danton DeMille
Attorney, Agent, or Firm—Wigman & Cohen

[57] ABSTRACT

Polymeric compositions particularly suitable for agricultural purposes are disclosed. These compositions contain at least 80% of either a polyolefin such as polyethylene or a copolymer of ethylene. A 0.5–15% additive containing the bond boron-oxygen such as anhydrous borax imparts a desirable opacity to these polymers in the high wavelength infra-red region of the spectrum, while not substantially interfering with the visible light necessary for photosynthesis.

9 Claims, No Drawings

METHOD FOR PROTECTING PLANTS USING POLYMERIC FILM CONTAINING ANHYDROUS BORAX

This a division of application Ser. No. 570,504, filed Jan. 13, 1984, now U.S. Pat. No. 4,559,381.

BACKGROUND OF THE INVENTION

The present invention relates to polymer compositions particularly suitable for agricultural purposes. More specifically, the invention relates to polymer films useful as covering materials for growing plants or crops.

It is well known by the actual state of the art the growing of plants under tunnels and green houses with plastic film opaque to long wave infrared radiation, particularly in the range 7–14 micrometers. This range is specifically transparent to the dry atmosphere. Those techniques have resulted in the production of earlier and more abundant crops.

The beneficial effects which these films have on the crops become even more pronounced as the film is made more opaque to the effects of the infra-red rays, within the above mentioned range of wavelengths yet at the same time, more transparent to the visible light necessary for photosynthesis.

These films, which are internationally known as "thermals", also reduce the risk of frost damage to the crops when heating is not available in the hothouse. Likewise, when heating is available, the films reduce the energy consumption. Both of these effects are attributable to the reduction of heat loss by radiation.

Most commercially available plastic films which are transparent to visible light are in some measure opaque to the infra-red radiation previously mentioned. The one most used worldwide for this application is polyethylene film, due to other important advantages both technical and economic. However, it is very transparent to the infra-red radiation ranging between 7 and 14 micrometers.

Previous attempts to alleviate the problems associated with the use of polyethylene film as a protector for crops have involved the addition of small quantities of "thermal additives", preferably of the mineral type such as: natural silicates (talc, kaolin, etc.), silica, calcium carbonate, barium sulphate, aluminum hydrate, and metallic hydroxysulphates, etc.

The following patents which disclose the aforementioned are:

French Pat. Nos. 1,574,088 of Apr. 16, 1968 and its continuation, 2,213,954 of Jan. 15, 1973; Japaneses Pat. No. 7,213,853 of May 15, 1968; Belgian Pat. No. 845,925 of Sept. 9, 1975; Japanese Pat. Nos. 5-1074-846 of Dec. 18, 1974 and 5-0088-147 of Nov. 8, 1973; and U.S. Pat. Nos. 4,134,875 of Mar. 17, 1978 and 4,170,087 of Oct. 9, 1979; as well as the article ∓Thermal Films for Hothouses", Seventh International Congress on Plastics in Agriculture by Graciano Jorge Tapia, Lisbon, October 1980.

The addition of the above-listed products to the polyethylene presents some disadvantages. For example, when used alone, most of them have to be added in large quantities in order to achieve good opacity to the infra-red radiation falling between 7 and 14 micrometers. However, these large quantities act as a filler on the polyolefin base, decreasing the mechanical properties and, more importantly, the overall transmission of the visible light.

To alleviate the problems associated with the use of a single additive, techniques are currently being studied whereby two or more of them are mixed together. However, such mixing greatly complicates the manufacturing process and reduces the ability of the polyethylene film to transmit the visible light necessary for photosynthesis.

Additionally, there are problems peculiar to many of the additives. For example, when the silica and silicates are exposed to the open air, they act as degrading agents on the polyethylene, thus reducing its life. The aluminum hydrate decomposes above the temperature of 180° C., releasing moisture, which enormously complicates the manufacturing processes, both of the compound and later of the film.

SUMMARY AND OBJECTS OF THE INVENTION

In view of the foregoing limitations and shortcomings of the prior art compositions, as well as other disadvantages not specifically mentioned above, it should be apparent that there still exists a need in the art for a polymeric composition for the manufacture of film for agricultural use which reduces or avoids the problems previously mentioned. It is, therefore, a primary objective of this invention to fulfill that need by providing a polymeric composition employing a series of additives which are more efficient than those used in previous techniques.

More particularly, it is an object of this invention to provide a polymeric composition which employs a relatively small amount of additive to obtain a desired thermal effect.

It is a further object of this invention to provide a polymeric composition for agricultural films which impedes the exit of infra-red radiation from a greenhouse through an otherwise transparent covering.

Yet another object of this invention is to provide a polymeric composition with a thermal additive that does not affect the aging properites of the film under the ultra-violet light.

Still another object of this invention is to provide a polymeric composition for agricultural films which does not substantially affect the overall transmission of visible light.

Briefly described, those and other objects of the invention are accomplished by providing a polymeric composition which includes at least 80% by weight of a polyolefin such as polyethylene, ehtylene/alpha-olefin copolymer, or an ethylene/vinyl acetate copolymer, and 0.5 to 15.0 wt.% of a chemical compound whose fundamental structure comprises a boron-oxygen bond in any of its forms.

With the foregoing and other objects, advantages, and features of the invention that will become hereinafter apparent, the nature of the invention may be more clearly understood by reference to the following detailed description of the invention and the appended claims.

DETAILED DESCRIPTION OF A PREFERRED EMBODIMENT

The polymeric composition of the present invention includes at least 80% wt. percent of a polyolefin such as polyethylene, ethylene/alpha-olefin, or ethylene/vinyl acetate, or blends of these products. The preferred range for the above-listed polyolefins is 90–97 wt.%. Additionally, there is a 0.5–15.0, and preferably 3 to 8 wt.% of a compound having the bond boron-oxygen.

Among the preferred boron-oxygen compounds are boric acid, alkaline and alkaline earth borates, aluminum borate, zinc borate, and anhydrous borax.

The selected polyolefins and boron-oxygen compounds may be mixed and then formed into films. The resulting compositions all have a very low transmitting capability in the region between 7 and 14 micrometers. Additionally, it has been found that the transmission of visible light through the polyolefin composition is not substantially reduced when anhydrous borax is employed as the boron-oxygen compound. Thus, the anhydrous borax additive does not interfere with photosynthesis.

The above-described products may also be utilized in a finely divided powder state, preferably with a medium particle size between 0.5 and 15 micrometers.

Besides those "thermal" additives which are the fundamental object of the present invention, other additives with effects known in the science may be incorporated, such as antioxidants, ultra-violet stabilizers, humidifiers, anti-statics, lubricants, etc. All these additives mentioned may be easily incorporated into the polyolefins by any one of the systems known in the plastics industry. In order to achieve a good dispersion of the mineral products, utilization of equipment having high shear power is advisable, such as Banbury type internal mixers, Buss-ko-knetter type or Werner Pfeiderer continuous mixers, etc., or mixing cylinders. Once the polymeric composition is obtained, the agricultural film can be manufactured by any of the known procedures, such as calendering, casting or tubular film extrusion, this last being the most suitable.

The following examples are offered to further describe the invention and should not be considered as limiting to the invention.

EXAMPLE 1

Several compositions were prepared by mixing polyethylene of low density with a series of known additives opaque to infra-red radiation of long wave-length and with other additives corresponding to the present invention. Mixtures of borax with an ethylene vinyl acetate copolymer were also prepared. The mixing was carried out in rotary mixers and then formed into a film of 150 micrometers thickness by the tubular-blowing process. Measurements were made of the infra-red transmission capacity between 730 and 1450 cm$^{-1}$ and of the overall transmission of visible light of these films. This work was done with the fundamental objective of determining the relative concentration necessary for each of the additives studied in order to obtain the same thermal efficacy in film of the same thickness, as well as to determine the overall transmission of visible light under those conditions. In Table I the results obtained are shown. These clearly show the greater efficacy of the additives of this invention as compared to those already known through previous techniques.

EXAMPLE 2

One of the compositions prepared in Example 1 containing 95% polyethylene and 5% anhydrous borax was formed by extrusion into a tubular film. When the melt was subjected to temperatures ranging from 180° C. to 300° C., there was no symptom of the formation of volatile products or decomposition of the active product which might affect both the manufacturing process itself and the properties of the film.

EXAMPLE 3

Several 150-micrometer thickness films were prepared with different types of thermal additives using the same procedure as in Example 1. In all cases, the composition included 95% polyethylene and 5% of thermal additive. These films were subjected to an accelerated ultra-violet aging test in a Weatherometer apparatus, equipped with a 6 KW Xenon lamp and a 70° C. black panel temperature. The aging time criterium was the necessary time for arriving at a 50% reduction of its original elongation. The results are shown in the following Table II.

TABLE I

| INFRA-RED ADDITIVE | EFFICACY OF VARIOUS THERMAL ADDITIVES | |
|---|---|---|
| | RELATIVE CCNCENTRATION NECESSARY TO OBTAIN THE SAME THERMAL EFFICACY IN 150-MICROMETER FILM | PERCENT OF OVERALL VISIBLE LIGHT TRANSMITTANCE OF 150-MICROMETER FILM OF IDENTICAL THERMAL EFFICACY |
| Anhydrous borax* | 1 | 90 |
| Calcium borate* | 1 | 90 |
| Magnesium borate* | 1 | 90 |
| Zinc borate* | 0,7 | 80 |
| Silica | 1,43 | 87 |
| Calcium carbonate | 1,98 | 71 |
| Talc | 1,88 | 85 |
| Aluminum hydrate | 1,74 | 86 |
| Alunite | 1,67 | 80 |
| Barium sulphate | 1,99 | 77 |
| Alunite/Aluminum hydrate (50/50) | 1,4 | 83 |
| Silica/Aluminum hydrate (33/67) | 1,26 | 83 |
| Calcium carbonate/Aluminum hydrate (50/50) | 1,63 | 79 |
| Anhydrous borax on EVA copolymer with 1% VA* | 0,8 | 91 |

*Additives of this present invention.

TABLE II

INFLUENCE OF VARIOUS TYPES OF THERMAL ADDITIVES IN THE AGING OF FILMS FOR AGRICULTURAL USE

| THERMAL ADDITIVE | RELATIVE TIME FOR ACHIEVING A 50% REDUCTION OF THE INITIAL ELONGATION |
|---|---|
| Anhydrous borax* | 100 |
| Silica | 80 |
| Aluminum silicates | 75 |
| Calcium carbonate | 94 |

*Additive of this invention.

It is evident from these results that the borax of the present invention influences the aging of the polyethylene exposed to ultra-violet light much less than other additives known in the technique, such as calcium carbonate, silica and silicates. It is obvious, as deduced from Example 1, that these previously known thermal additives would have to be included in greater concentrations than the borax of the present invention in order to obtain the same thermal efficacy, in which case the negative influence on the aging would be even greater.

Consequently it remains adequately demonstrated that the present invention covers polyolefin or copolymer of ehtylene films for agricultural use more opaque to infra-red radiation between 7 and 14 micrometers wavelength and at the same time more transparent to visible light, and therefore more suited to this application than those known to the present practice of the technique.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of protecting plants and crops comprising the step of covering said plants with a polymeric film selected from the group consisting of polyethylene and a copolymer of ethylene, said film comprising, by weight, not less than about 95% ethylene, and from about 0.5% to about 5.0% anhydrous borax which imparts to said film a low thermal transmittance between 7 and 14 micrometers and with excellent light diffusion properties.

2. The method according to claim 1, wherein said film composition comprises from about 95% to about 97% ethylene and from about 3% to about 5% anhydrous borax.

3. The method according to claim 1, further comprising additives selected from the group consisting of antioxidants, ultraviolet stabilizers, humidifiers, anti-statics and lubricants.

4. The method according to claim 1, wherein said film is polyethylene.

5. The method according to claim 4, wherein said film composition comprises from about 95% to about 97% ethylene and from about 3% to about 5% anhydrous borax.

6. The method according to claim 5, further comprising additives selected from the group consisting of antioxidants, ultraviolet stabilizers, humidifiers, anti-statics and lubricants.

7. The method according to claim 1, wherein said copolymer of ethylene is with an alpha-olefin.

8. The method according to claim 1, wherein said copolymer of ethylene is with a vinyl acetate, with the vinyl acetate content of said copolymer being less than 5 wt. %.

9. The method according to claim 1, further comprising additives selected from the group consisting of antioxidants, ultraviolet stabilizers, humidifiers, anti-statics and lubricants.

* * * * *